(12) United States Patent
Leiria et al.

(10) Patent No.: US 11,105,710 B2
(45) Date of Patent: Aug. 31, 2021

(54) SINGLE OTDR MEASUREMENT FOR A PLURALITY OF FIBERS

(71) Applicant: Xieon Networks S.à.r.l., Luxembourg (LU)

(72) Inventors: Mario Leiria, Lisbon (PT); Tiago Mestre, Idanha (PT)

(73) Assignee: XIEON NETWORKS S.a.r.l., Luxembourg (LU)

( * ) Notice: Subject to any disclaimer, the term of this patent is extended or adjusted under 35 U.S.C. 154(b) by 93 days.

(21) Appl. No.: 16/245,851

(22) Filed: Jan. 11, 2019

(65) Prior Publication Data

US 2019/0257715 A1   Aug. 22, 2019

(30) Foreign Application Priority Data

Feb. 16, 2018  (EP) .................................... 18157177

(51) Int. Cl.
  *H04B 10/071* (2013.01)
  *G01M 11/00* (2006.01)
  *H04J 14/02* (2006.01)

(52) U.S. Cl.
  CPC .... *G01M 11/3136* (2013.01); *G01M 11/3127* (2013.01); *G01M 11/3181* (2013.01); *H04B 10/071* (2013.01); *H04J 14/02* (2013.01)

(58) Field of Classification Search
  CPC .......... G01M 11/3127; G01M 11/3136; H04B 10/071; H04B 10/0771
  See application file for complete search history.

(56) References Cited

U.S. PATENT DOCUMENTS

| 2013/0259469 | A1* | 10/2013 | Smith ................. H04J 14/0282 398/16 |
| 2016/0187224 | A1 | 6/2016 | Chen et al. |
| 2017/0294959 | A1 | 10/2017 | Archambault et al. |

OTHER PUBLICATIONS

Jong Hoon Lee, "A Remotely Reconfigurable PON Architecture for Efficient Maintenance and Protection" 2009,Optical Society of America (Year: 2009).*
Siti Asma Che Aziz, "Automatic Protection Unit in Application of Restoration Scheme for FTTH Passive Optical Network",2009 International Conference on Computer Technology and Development (Year: 2009).*
Extended Search Report, European Application No. 18157177.9, dated Sep. 11, 2018, 8 pages.

* cited by examiner

*Primary Examiner* — Maurice C Smith (57) ABSTRACT

A first optical path and a second optical path have a common path branching point. An OTDR sampling optical signal is emitted into the first optical path and into the second optical path through the common path branching point. At least one predefined optical property of the OTDR sampling optical signal emitted into the second optical path is altered and/or of a reflection of the OTDR sampling optical signal received from the second optical path is altered. An OTDR reflected optical signal resulting from a reflection of the OTDR sampling optical signal on the first optical path and/or from a reflection on the second optical path is detected. The OTDR reflected optical signal is analyzed to determine, based on the at least one predefined optical property, whether the OTDR reflected optical signal resulted from a reflection on the first optical path and/or on the second optical path.

19 Claims, 5 Drawing Sheets

SINGLE OTDR MEASUREMENT FOR A PLURALITY OF FIBERS

PRIORITY INFORMATION

This application claims priority to and the benefit of European Patent Application No. 18157177.9, filed in the European Patent Office on Feb. 16, 2018, the entire contents of which are incorporated herein by reference.

FIELD OF THE INVENTION

The present invention is in the field of fibre-optic communication. In particular, the present invention relates to a method of performing optical time domain reflectometry (OTDR) measurements in an optical transmission system comprising a plurality of optical paths and to an optical system suitable for performing such OTDR measurements.

BACKGROUND OF THE INVENTION

Optical time reflectometry (OTDR) measurements are used in the field of fiber-optic communication to gain insight into the main optical parameters of an optical path, like information regarding fiber attenuation, and to detect impairments or irregularities, like deteriorated connectors or fiber breakages. An OTDR measurement is typically performed by means of a light source and of a detector. The light source sends an optical pulse into the optical path to be tested, which is then partly reflected back by the fiber itself or by an irregularity on the path, also called a "reflection event". The reflected optical pulse is then received by the detector and analyzed so as to extract characterizing information about the optical path. For example, assuming knowledge of the speed of light on the optical path, a measure of the time elapsed between the emission of an optical pulse by the light source and the detection of the reflected pulse at the detector can be straightforwardly converted into information about the distance between an optical time reflectometer used for performing the OTDR measurement and the corresponding reflection point.

Protection against failures is often implemented in a fiber optic communication network by optical transmission section (OTS) protection, which is based on establishing end-to-end link protection by doubling the optical links of the network. In OTS protection, each optical fiber joining two nodes of the network runs in parallel to another optical fiber providing a backup optical link. Optical traffic transmitted from a node to another node is transmitted over both available links, i.e. over an "active" fiber and over a "protection" fiber. That way, each two nodes of the network are optically connected by at least two equivalent optical paths so that the correct transmission of an optical signal over an optical link can be ensured even in the event of failure on a particular optical link by switching to a corresponding parallel alternative link.

When OTS protection is used in combination with OTDR measurements without additional equipment, an OTDR optical pulse sent to the active optical fiber will also be transmitted over the corresponding protection optical fiber. If a reflective event has occurred on one of the optical paths, it may be difficult to determine whether the reflective event corresponding to a received reflected optical pulse has occurred on the optical path comprising the active fiber or on the optical path comprising the protection fiber. Further, more than one reflected optical pulses corresponding to the optical pulse that was sent out may be simultaneously received by the OTDR detector. In this case, it may be difficult to determine the origin of each one of the reflected optical pulses.

A similar problem may arise for OTDR measurements made in a passive optical network (PON) implementing a point-to-multipoint network architecture in which optical splitters are used to enable a single main optical path to transmit optical signals between an optical line terminal (OLT) hosted by a service provider and multiple optical network terminals (ONTs) or optical network units (ONUs) near the end users. PONs are often used in telecommunications technology to serve a plurality of individual end consumers (the ONTs orrr ONUs), wherein each ONT or ONU is connected to the main optical path through an optical splitter by means of a corresponding branch optical path. An OTDR optical pulse sent through the main optical path of a PON may reach more than one branch optical path. Therefore, one or more reflected optical pulses may be received by the corresponding OTDR detector and it may be difficult to determine in which of the branch optical paths the reflected optical pulse originated.

A possible solution to this problem relies on performing separate OTDR measurements for each optical path. However, this requires the use of additional optical equipment, like optical switches and optical filters, for optically connecting each of the optical fiber of the network to an OTDR measurement facility. Further, this solution can be time-consuming, since a high number of measurements may have to be made. Alternatively, different OTDR devices may be used for each of the optical path of an optical transmission system. However, such a solution is connected with a significant increase in equipment costs.

US 2014/0133847 A1 describes a method of performing separate OTDR measurements with different wavelengths for different optical paths in an optical transmission system based on the use of optical filters. WO 2012/128677 A1 describes a method of performing OTDR measurements in a wavelength division multiplexed optical networks using an optical switch, a plurality of optical splitters and an arrayed waveguide grating.

There is hence room for technical improvement in the field of fibre-optic indication regarding OTDR measurements performed in a plurality of fibers.

SUMMARY OF THE INVENTION

The object of the present invention is to provide for the possibility of determining the origin of a reflective event detected by means of an OTDR measurement based on an OTDR sampling optical signal emitted into a plurality of optical paths of an optical communication system having a common path start point. This is achieved by a method according to claim 1 and by an optical system according to claim 10. Preferable embodiments of the invention are described in the dependent claims.

The invention refers to a method of performing an optical time domain reflectometry, OTDR, measurement in an optical transmission system comprising a first optical path and a second optical, wherein the first optical path (52) and the second optical path (54) have a common path branching point (22). An "optical path" refers herein to any kind of optical link provided in an optical transmission system, be it between different optical devices or within one or more of said devices. An optical path may in particular comprise one or more optical fibers. An "irregularity" is herein understood to have a broad meaning and to covers any kind of malfunction or abrupt medium change resulting in an abrupt modification of the index of refraction of an optical path due to, for instance, a breakage, a defect, connections between different types of fibers, an interruption or any other kind of irregularity.

The first and second optical paths have a common path branching point. The common branching point may be a common starting point at which the first optical path and a second optical path join, like for example a point situated within an optical splitter, an optical coupling device or the like.

Although the invention is herein described with reference to two optical paths, namely the first optical path and the second optical path, the method of the invention may be adapted straightforwardly to a larger number of optical paths, so that the scope of the present invention should not be construed as being restricted to the case in which only two optical paths are present. An optical transmission system, like for example a passive optical network, may comprise a large number of optical paths having a common path branching point. Further, as it will be evident to the skilled person, the references to the first optical path and the second optical path, as used consistently throughout the present disclosure, are mutually exchangeable.

The method comprises emitting an OTDR sampling optical signal into the first optical path and into the second optical path through the common path branching point. "Optical signal" is understood herein to have a broad meaning that covers any kind of electromagnetic wave suitable for being transmitted in an optical transmission system. The optical signal may for example comprise one or more light pulses having an amplitude substantially different to a zero value for a at least one finite period of time.

The same OTDR sampling optical signal is generated and emitted into the first optical path and into the second optical path through the common path branching point so that the OTDR sampling optical signal is transmitted on the first optical path and on the second optical path. The OTDR sampling optical signal is hence generated once, i.e. in one light generation event, for both the first and the second optical path with controlled optical properties such as wavelength, pulse shape, and amplitude that may be predefined. The generated OTDR sampling optical signal is directed to the first optical path and to the second optical path through the common path branching point for transmission. The OTDR sampling optical signal may hence be simultaneously emitted into and transmitted on the first optical path and on the second optical path. In a given amount of time after the emission of the OTDR sampling optical signal, the OTDR sampling optical signal may cover equal optical path lengths along the first and second optical paths.

The OTDR sampling optical signal may be generated by means of any kind of light source like, but not restricted to, a laser source. A suitable optical device may further be used for directing the OTDR sampling optical signal to the first optical path and to the second optical path, like for instance an optical splitter, an optical coupler, an optical switch or any suitable optical device. Further details on apparatus implementations of the invention will be given below.

The method further comprises altering at least one predefined optical property of the OTDR sampling optical signal emitted into the second optical path and/or of a reflection of the OTDR sampling optical signal received from the second optical path. Thus, the OTDR sampling optical signal may be altered when being emitted into the second optical path, i.e. before or shortly after the OTDR sampling optical signal enters the second optical path for transmission. Additionally or alternatively, a reflection of the OTDR sampling optical signal generated on the second optical path by a reflection event of the OTDR sampling optical signal emitted into the second optical path may be altered when being backreflected from the second optical path by altering the at least one predefined optical property thereof. Thus the at least one predefined optical property may be altered before and/or after a reflection event occurs in the optical transmission system.

The method further comprises detecting an OTDR reflected optical signal resulting from a reflection of the OTDR sampling optical signal on the first optical path and/or from said reflection of the OTDR sampling optical signal on the second optical path. If at least one of the first optical path and a the second optical path contains an optical irregularity, when the OTDR sampling optical signal reaches that irregularity, the corresponding abrupt change in the index of refraction of the optical path may cause a considerable amount of light of the OTDR sampling optical signal to be reflected back due to Fresnel reflection and/or Rayleigh backscattering. As known to persons skilled in the art, Fresnel reflection can be up to thousands of times more significant than the constant low level Rayleigh backscattering created on an optical path, like e.g. an optical transmission fiber. The back-reflected light of a given OTDR sampling optical signal forms a corresponding OTDR reflected optical signal resulting from such a Fresnel reflection of the OTDR sampling optical signal at the irregularity.

The OTDR reflected optical signal may correspond to a reflection of the OTDR sampling optical signal on the first optical path, if the first optical path includes an irregularity, or to the aforesaid reflection of the OTDR sampling optical signal on the second optical path, if the second optical path includes an irregularity. Further, the OTDR reflected optical signal may correspond to reflections of the OTDR sampling optical signal both on the first optical path and on the second optical path in case both the first optical path and a second optical path include irregularities.

In any case, a reflected OTDR sampling optical signal resulting from a reflection on the second optical path may be distinguished from a reflected OTDR sampling optical signal resulting from a reflection on the first optical path by a discrepancy related to the at least one predefined optical property. The method may comprise altering the at least one predefined optical property of the OTDR sampling optical signal emitted into the second optical path and/or of the OTDR reflected optical signal received from the second optical path without altering any of the OTDR sampling optical signal or the OTDR reflected optical signal transmitted on the first optical path.

The OTDR reflected optical signal may be detected by means of a light receiver configured for detecting the OTDR reflected optical signals reflected on the first optical path and/or on the second optical path. Detecting an OTDR reflected optical signal may comprise generating a time-dependent electrical signal corresponding to the detected OTDR reflected optical signal. Such a time-dependent electrical signal may for example have an amplitude proportional to the amplitude of the corresponding OTDR reflected optical signal. A light receiver configured for detecting the OTDR reflected optical signal may comprise a pin diode, a coherent receiver, an avalanche photodiode, or any other suitable optical device.

The method further comprises analyzing the OTDR reflected optical signal to determine, based on the at least one predefined optical property, whether the OTDR reflected optical signal resulted from a reflection on the first optical path and/or from a reflection on the second optical path.

Since an OTDR reflected optical signal that is received from the first optical path displays a discrepancy with the OTDR sampling optical signal that is received from the second optical path with respect to the at least one predefined optical property, the origin of the OTDR reflected optical signal can be backtracked based on the at least one predefined optical property.

For example, if altering at least one predefined optical property of the OTDR sampling optical signal emitted into the second optical path comprises altering a pulse shape thereof, the OTDR sampling optical signal emitted into the first optical path will have a pulse shape corresponding to the original pulse shape of the OTDR sampling optical signal when it was generated, for instance a rectangular pulse shape. The OTDR sampling optical signal emitted into the second optical path may be altered to have a gaussian pulse shape. In this exemplary case, the pulse shape of an OTDR reflected optical signal resulting from a reflection on the first optical path has a rectangular pulse shape, whereas an OTDR reflected optical signal resulting from a reflection on the second optical path has a gaussian pulse shape. Thus, if the analysis of the OTDR reflected optical signal reveals that the OTDR reflected optical signal has a rectangular pulse shape, it may be determined that the OTDR reflected optical signal resulted from a reflection on the first optical path. Instead, if the analysis of the OTDR reflected optical signal reveals that the OTDR reflected optical signal has a gaussian pulse shape, it may be determined that the OTDR reflected optical signal resulted from a reflection on the second optical path. The reflection and dispersion characteristic of the first and second optical paths may be taken into account when analyzing the OTDR reflection optical signal so as to account e.g. for absorption losses and dispersion losses.

However, the OTDR sampling optical signal emitted into the second optical path may be left unaltered. Instead, the at least one predefined optical property of the OTDR reflected optical signal corresponding to a reflection event on the second optical path may be altered. In this case, the OTDR sampling optical signal emitted into the first optical path and the OTDR sampling optical signal emitted into the second optical path will have the pulse shape of the original pulse shape of the OTDR sampling optical signal when it was generated, that is, a rectangular pulse shape in the example at hand. The OTDR reflected optical signal received from the second optical path may however be altered to have a gaussian pulse shape. Thus, the pulse shape of an OTDR reflected optical signal resulting from a reflection on the first optical path will have a rectangular pulse shape, whereas an OTDR reflected optical signal resulting from a reflection on the second optical path will have a gaussian pulse shape. An analogous analysis as described above can hence be carried out to determine whether the OTDR reflected optical signal resulted from a reflection on the first optical path and/or from a reflection on the second optical path.

It may also be the case that the OTDR reflected optical signal displays a mixture of a rectangular pulse shape and a gaussian pulse shape. It may then be determined that the OTDR reflected optical signal resulted from a reflection on the first optical path and from a reflection on the second optical path.

The process set forth above may be extended to an arbitrary number of optical paths larger than two and to corresponding many ways of altering the predefined optical property. For example, in order to implement the method of the invention in an optical system comprising a number N of optical paths having a common path branching point, the predefined optical property may be altered in N−1 different manners for N−1 of the optical paths. Additionally or alternatively, a different predefined optical property may be altered for each one of N−1 optical paths. The OTDR reflected optical signal may be analysed in a processing unit that may be operatively connected with a light receiver configured for detecting the OTDR reflected optical signal and with a light source configured for emitting the OTDR sampling optical signal.

The method of the invention allows determining whether an irregularity in the optical transmission system is optically coupled to the first optical path and/or to the second optical path. Contrary to traditional methods for performing OTDR measurement in an optical transmission system with optical paths having common path branching points, the method of the invention does not require separate OTDR measurements on the first optical path and on the second optical path. Instead, a single OTDR measurement can be used to determine whether an irregularity in the optical transmission system is optically coupled to the first optical path and/or to the second optical path.

This way, surveillance and maintenance tasks for an optical transmission system can be simplified due to a reduced number of necessary measurements. Further, the material costs related to these tasks can be reduced, since no additional optical devices, like optical switches or couplers, are required for optically coupling different OTDR sampling optical signals into different optical paths. A reduced amount of optical equipment involved in the measurements may further contribute to a better accuracy thereof, due e.g. to reduced additional dispersion and absorption losses.

In preferred embodiments of the invention, the first optical path may be parallel to the second optical path. The first and second optical paths may run in parallel such that the first optical path may serve as a backup optical path while optical data is transmitted over the second optical path or the other way around in order to implement optical path protection, like e.g. optical transmission section (OTS) protection, in the optical transmission system.

"Parallel" is to be understood in the context of this disclosure as "optically parallel" and not necessarily "geometrically parallel". Thus, the first and second optical paths need not follow lines that are spatially or geometrically parallel. An optical signal may be transmitted between any two locations of the optical transmission system that are passed by the first and second optical paths both through the first optical path and through the second optical path under equivalent or substantially identical optical conditions. In particular, "parallel" may indicate that the first and second optical paths have two common branching points: a common path start point and a common path end point, wherein the OTDR sampling optical signal is emitted into the first optical path and into the second optical path through the common path start point.

According to preferred embodiments of the invention, the method may further comprise determining, based on the at least one predefined optical property, whether the OTDR reflected optical signal resulted from a reflection on the first optical path and/or from a reflection on the second optical path. Thus, the step of analysing the OTDR reflected optical signal may be followed by a step of actually determining the origin of the OTDR reflected optical signal, based on the analysis, i.e. of associating the OTDR reflected optical signal to a reflection event on the first optical path and/or on the second optical path. The step of determining whether the OTDR reflected optical signal resulted from a reflection on the first optical path and/or from a reflection on the second optical path may be software-based and may be carried out by a suitably configured processing unit, like a computer or a portable device.

In addition, the method may comprise a step of determining a time period related to a time delay between the emission of the OTDR sampling optical signal and the detection of the OTDR reflected optical signal in order to determine a location of the reflection event or irregularity from which the OTDR reflected optical signal originates. Further, the method may comprise an analysis based on a comparison of the OTDR reflected optical signal with the OTDR sampling optical signal in order to determine the type of reflection event from which the OTDR reflected optical signal originates. The reflection and dispersion characteristics of the first and second optical paths may be taken into account in such analysis.

In preferred embodiments of the invention, the at least one optical property may comprise one or more of a pulse width, a pulse shape, a pulse wavelength, a chromatic dispersion, and a polarization mode dispersion. "Pulse width" may be understood herein to refer to a time interval over which an optical signal has an amplitude substantially different from zero, i.e. an amplitude that can be distinguished from background noise and/or from Rayleigh backscattering light or to quantities that are mathematically related thereto like average width, full width at half maximum and the like. "Pulse shape" may refer to the variation of the amplitude of an optical signal over time during a pulse width interval, i.e. between two zeroes of the pulse width. "Pulse wavelength" may refer herein to the wavelength range over which an optical signal has an amplitude substantially different from zero. "Chromatic dispersion" refers herein to a dependence of the phase velocity of a wave depends on its frequency or wavelength. "Polarization mode dispersion" refers herein to the possibility of increasing a delay between light transmitted in different, for example mutually orthogonal, polarization directions, which may lead to pulse broadening. The at least one optical property may be selectively chosen to be an optical property that remains substantially unaffected by reflection events like irregularities an optical path, fiber breakages, and the like.

According to preferred embodiments of the invention, the at least one optical property may comprise the pulse width, and altering the at least one optical property may comprise broadening or narrowing a pulse width of the OTDR sampling optical signal emitted into the second optical path and/or of said reflection of the OTDR sampling optical signal received from the second optical path. This allows easily determining whether the OTDR reflected optical signal resulted from a reflection on the first optical path and/or from a reflection on the second optical path by analysing the pulse width of the OTDR reflected optical signal.

In some preferred embodiments of the invention, the at least one predefined optical property may be altered by means of a photonic crystal fiber and/or an optical filter. Photonic crystal fibers, PCF, may be selectively chosen according to their dispersion properties and are easily available on the market at low costs. The PCF may be optically coupled to the second optical path. Since PCFs are purely passive devices, they provide an easy way of implementing the present invention to existing networks without altering the transmission properties that affect non-OTDR optical signals. If the invention is implemented in optical transmission systems comprising more than two optical paths having a common path branching point, a corresponding number of different PCFs may be employed for differently altering the predefined optical property. However, the at least one predefined optical property may be altered by any other suitable optical device having known or controllable dispersion characteristics.

In some preferred embodiments of the invention, the at least one optical property may be selectively altered only within a predefined wavelength subrange of the OTDR sampling optical signal and/or of the OTDR reflected optical signal. By selecting a predefined wavelength subrange within which the at least one optical property is altered, it can be ensured that the alteration does not uncontrollably affect other optical signals than the OTDR sampling optical signal and/or the OTDR reflected optical signal, like for example optical data being transmitted on the first optical path and/or on the second optical path.

According to preferred embodiments of the invention, the predefined wavelength subrange may be between 850 nm and 1650 nm, preferably between 1310 nm and 1650 nm, more preferably between 1565 nm and 1650 nm.

In a preferred embodiment of the invention, analysing the OTDR reflected optical signal may comprise analysing a superposition of a first OTDR reflected optical signal and a second OTDR reflected optical signal, wherein the first OTDR reflected optical signal results from a first reflection of the OTDR sampling optical signal on the first optical path and/or on the second optical path, and wherein the second OTDR reflected optical signal results from a second reflection of the OTDR sampling optical signal on the first optical path and/or on the second optical path. There may be a first reflection event on the first optical path resulting in the first OTDR reflected optical signal and a second reflection event on the second optical path resulting in the second OTDR reflected optical signal. However, there may also be a first reflection event resulting in the first OTDR reflected optical signal and a second reflection event resulting in the second OTDR reflected optical signal, both the first and the second reflection events being on the first optical path or on the second optical path.

For instance, the first reflection event may respectively correspond to a first optical length and the second reflection event may correspond to a second optical length. The first and second optical lengths are optical lengths over which the OTDR sampling optical signal is transmitted before reaching the respective reflection event. The first optical length and the second optical length may extend along the first optical path and/or along the second optical path. The first and second optical lengths may differ by an optical length that is of the order of the pulse width of the OTDR sampling optical signal or smaller. In this case, the OTDR reflected optical signal may correspond to a superposition of the first OTDR reflected optical signal and the second OTDR reflected optical signal. The first OTDR reflected optical signal and the second OTDR reflected optical signal may hence be comprised in the detected OTDR reflected optical signal and may hence be simultaneously detected and analysed.

In such a situation, the method of the invention allows analysing the OTDR reflected optical signal to determine, based on the at least one predefined optical property, whether the OTDR reflected optical signal resulted from a first reflection on the first optical path and a second reflection on the second optical path, or from a first reflection and a second reflection on one of the optical paths. Referring back to the example elucidated above, if the OTDR optical signal emitted into the first optical path has a rectangular pulse shape and the OTDR sampling optical signal emitted into the second optical path has a gaussian pulse shape, in case reflection events occur on the first optical path and on the second optical path, the OTDR reflected optical signal may comprise a superposition of a rectangular pulse shape and a gaussian pulse shape. If, instead, reflection events only occur on the first optical path or on the second optical path, the OTDR reflected optical signal may respectively comprise a corresponding superposition of rectangular pulse shapes or of gaussian pulse shapes.

Detecting and analysing the OTDR reflected optical signal may hence allow determining that the OTDR reflected optical signal results from more than one reflection event, and to which of the first and second optical fibers each reflection event was coupled. Further, detecting and analysing the OTDR reflected optical signal may allow determining the type of irregularity and the location along the respective optical path corresponding to the corresponding reflection event.

In preferred embodiments of the invention, analyzing the OTDR reflected optical signal may comprise correlating the first OTDR reflected optical signal and the second OTDR reflected optical signal in time. Correlating the first OTDR reflected optical signal and the second OTDR reflected optical signal in time may allow determining a difference in the optical lengths over which the OTDR sampling optical signal is transmitted before reaching the respective reflection event, that is a difference in optical length between the reflection event from which the first OTDR reflected optical signal originates and the reflection event from which the second OTDR reflected optical path originates.

According to preferred embodiments of the invention, analyzing the OTDR reflected optical signal may comprise detecting a number of local maxima in the OTDR reflected optical signal. This allows obtaining a first estimate of the number of reflection events in the optical communication system from which the OTDR reflected optical signal originates and adapting the analysis accordingly. For instance, if two local maxima are detected, the analysis may be adapted to analysing a first OTDR reflected optical signal and a second OTDR reflected optical signal comprised in the OTDR reflected optical signal. If three local maxima are detected, the analysis may be adapted to analysing a first OTDR reflected optical signal, a second OTDR reflected optical signal, and a third OTDR reflected optical signal comprised in the OTDR reflected optical signal. Detecting a number of local maxima can be done in ways that are known to the skilled person and that need not be described in detail, like for example by applying a peak picking algorithm.

In some preferred embodiments of the invention, analyzing the OTDR reflected optical signal may comprise fitting one or more model functions to the OTDR reflected optical signal. Each of the one or more model functions may be any mathematical function suitable for being fitted to a time representation of the amplitude of the OTDR reflected optical signal, like a Gaussian function, a polynomial function, or the like. The one or more model functions may be characterised by parameters that can be used for analysing the OTDR reflected optical signal. For example, parameters corresponding to the fit of the one or more model functions to the OTDR reflected optical signal may allow extracting information about the type of the irregularity from which the OTDR reflected optical signal originates, and/or the location of said irregularity on the first optical path and/or the second optical path.

Further, analyzing the OTDR reflected optical signal may comprise fitting a first model function to the first OTDR reflected optical signal and/or fitting a second model function to the second OTDR reflected optical signal. In this way, the first OTDR reflected optical signal may be individually analysed, for example by being individually compared with the OTDR sampling optical signal, preferably taking into account the dispersion and reflection characteristics of the first optical path and/or of the second optical path.

By way of example, if an OTDR sampling optical signal encounters three reflection events, in the course of the analysis of the OTDR reflected optical signal the presence of three local maxima may be detected, whereupon three model functions may respectively be fitted to first to third OTDR reflected optical signals comprised in the OTDR reflected optical signal. A possible exemplary outcome of the analysis may be that a first and a second reflection event occurred on the first optical path and a third reflection event occurred on the second optical path.

In preferred embodiments of the invention, analyzing the OTDR reflected optical signal may comprise minimizing a difference between the OTDR reflected optical signal and a superposition of the one or more model functions. The aforesaid difference may for example be minimized by means of a least square method or any other of the error minimisation methods that are known to the skilled person A further aspect of the invention refers to an optical system suitable for performing an OTDR measurement in an optical transmission system comprising a first optical path and a second optical path to determine whether an irregularity in the optical transmission system is optically coupled to the first optical path or to the second optical path. The optical system comprises an optical time domain reflectometry, OTDR, optical connection port suitable for being optically connected with an OTDR device and an optical coupling device configured for transmitting an optical signal from the OTDR optical connection port to the first optical path and to the second optical path, and/or for transmitting a first optical signal from the first optical path and the second optical signal from the second optical path to the OTDR optical connection port. The optical system further comprises a signal alteration device optically coupled between the optical coupling device and the second optical path, wherein the signal alteration device is configured for altering at least one predefined optical property of an optical signal transmitted from the OTDR optical connection port to the second optical path and/or of an optical signal transmitted from the second optical path to the OTDR optical connection port. The optical coupling device may comprise an optical switch, an optical coupler, and/or an optical splitter. Note that the optical coupling device constitutes or at least comprises a common path branching point in the sense of the present disclosure.

The optical system may be suitable for performing the OTDR measurement in an optical transmission system comprising an arbitrary number of optical paths larger than two by altering the predefined optical property in correspondingly many ways or by altering correspondingly many predefined optical properties as explained above.

According to preferred embodiments of the invention, the first optical path may be parallel to the second optical path. The optical system of the invention may then be an optical arrangement configured for being optically connected to an existing optical transmission system that comprises a first optical path and a second optical path parallel to the first optical path. For example, the optical system may be a connecting arrangement suitable for optically connecting an optical time domain reflectometer with the first and second optical paths of the optical transmission system.

The optical system of the invention may however also be an optical arrangement configured for being integrated in an existing optical transmission system comprising a first optical path and a second optical path having a common path branching point. For instance, the optical system may be an optical arrangement suitable for establishing an optical connection between a first optical path and a second optical path on one side and a main optical path on the other side so that optical data can be received and transmitted through the optical system. For instance, the first and second optical path may respectively correspond to optical paths of a passive optical network corresponding to different ONTs and/or ONUs connected to the OLT through a common optical splitter and through the main optical path.

Further, in case the first optical path is parallel to the second optical path, the optical system may be configured for receiving optical data from the main optical path and for transmitting the optical data in a protected manner on the first optical path and the second optical path, i.e. wherein one of the first optical path and the second optical path acts as an active optical path and the other one acts as a backup or protection optical path. Additionally or alternatively, the optical system may be configured for receiving optical data from the first optical path and the second optical path in a protected manner and for transmitting the optical data on the main optical path.

In preferred embodiments of the invention, the signal alteration device may comprise a pulse width changing device, the at least one optical property may comprise a pulse width, and the pulse width changing device may be configured for broadening or narrowing a pulse width of optical signal transmitted from the OTDR optical connection port (18) to the second optical path and/or of an optical signal transmitted from the second optical path to the OTDR optical connection port.

According to preferred embodiments of the invention, the signal alteration device may be configured for selectively altering the predefined optical property of an optical signal transmitted from the OTDR optical connection port (18) to the second optical path (54) and/or of an optical signal transmitted from the second optical path (54) to the OTDR optical connection port (18) within a predefined wavelength subrange.

In preferred embodiments of the invention the predefined wavelength subrange may be between 850 nm and 1650 nm, preferably between 1310 nm and 1650 nm, more preferably between 1565 nm and 1650 nm.

In some preferred embodiments of the invention, the signal alteration device may comprise a photonic crystal fiber and/or an optical filter.

In preferred embodiments of the invention, may further comprise an optical time domain reflectometer optically connected to the OTDR optical connection port. The optical system including the optical time domain reflectometer may be configured for performing the method of any of the embodiments of the invention described above. In particular, the optical time domain reflectometer may be configured for emitting an OTDR sampling optical signal into the first optical path and into the second optical path, for detecting an OTDR reflected optical signal resulting from a reflection of the OTDR sampling optical signal on the first optical path and/or on the second optical path, and for analyzing the OTDR reflected optical signal to determine, based on the at least one predefined optical property, whether the OTDR reflected optical signal resulted from a reflection on the first optical path and/or from a reflection on the second optical path.

The optical time domain reflectometer may comprise a processing unit configured for analysing the OTDR reflected optical signal according to any of the embodiments of the invention described above.

In some preferred embodiments of the invention, the optical system may comprise an optical switch configured for selectively optically connecting the OTDR optical connection port with the first optical path, the second optical path, and/or with one or more further optical paths.

According to preferred embodiments of the invention, the optical system may further comprise an optical coupler configured for optically connecting the OTDR optical connection port with the first optical path and the second optical path through the optical coupling device.

DESCRIPTION OF PREFERRED EMBODIMENTS

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to one skilled in the art to which the invention relates.

Figure 1A:
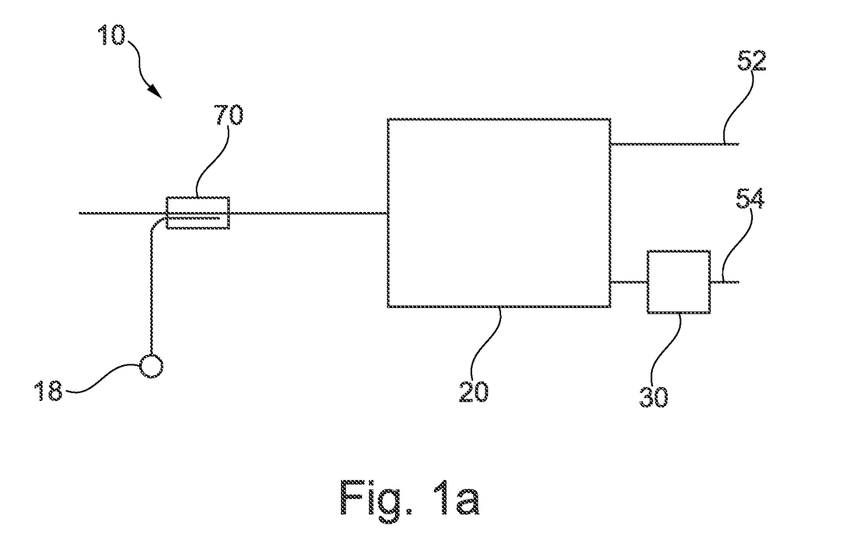
FIG. 1*a* is shows an optical system according to an embodiment of the invention.

FIG. 1*a* shows an optical system 10 suitable for performing an OTDR measurement in an optical transmission system comprising a first optical path 52 and a second optical path 54 having a common path branching point according to an embodiment of the invention. The first optical path 52 and a second optical path 54 run optically in parallel implementing optical path protection. The optical system 10 comprises an OTDR optical connection port 18 that is suitable for being optically connected with an OTDR device that is not shown in the figure, an optical coupling device 20 configured for transmitting an optical signal from the OTDR optical connection port 18 to the first optical path 52 and to the second optical path 54 and for transmitting a first optical signal from the first optical path 52 and a second optical signal from the second optical path 54 to the OTDR connection port 18. The OTDR optical connection port 18 can be directly optically connected with the optical coupling device 20, which in the embodiment shown comprises the common path branching point.

The optical system 10 further comprises a signal alteration device 30 optically coupled between the optical coupling device 20 and the second optical path 54. The signal alteration device 30 is configured for altering at least one predefined optical property of an optical signal transmitted from the OTDR optical connection port 18 to the second optical path 54 and/or of an optical signal transmitted from the second optical path 54 to the OTDR optical connection port 18. The optical system 10 further comprises an optical coupler 70 that is configured for optically connecting the OTDR optical connection port 18 with the first optical path 52 and the second optical path 54 through the optical coupling device 20.

The optical system 10 can be implemented as an optical arrangement configured for being optically connected to an existing optical transmission system that comprises the first optical path 52 and the second optical path 54, wherein the second optical path 54 runs parallel to the first optical path 52, and for connecting an optical time domain reflectometer (not shown) to the OTDR optical connection port 18.

Figure 1B:
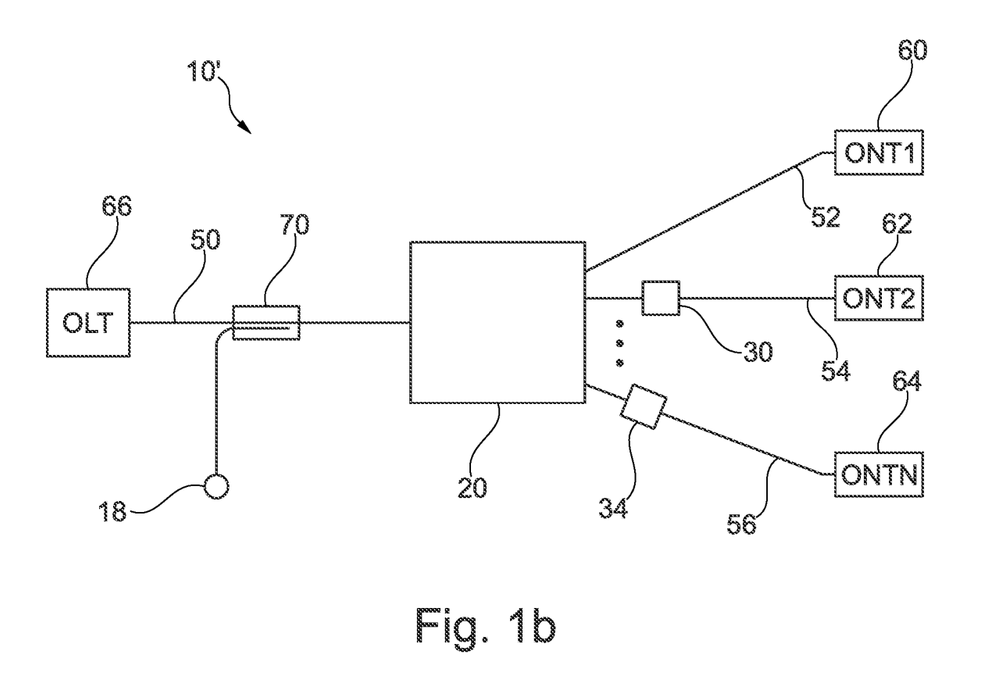
FIG. 1*b* shows an optical system according to another embodiment of the invention.

FIG. 1*b* shows an optical system 10' according to another embodiment of the invention suitable for performing an OTDR measurement in an optical transmission system comprising N optical paths 52-56 (of which only three are exemplarily represented in FIG. 1*b*) having a common path branching point comprised in an optical splitter 20. Each of the N optical paths 52-56 optically connects the optical coupling device 20 with a respective ONT 60-64 of a PON. The optical system 10 further comprises an OTDR optical connection port 18 that is suitable for being optically connected with an OTDR device that is not shown in the figure. The optical coupling device 20, which in the embodiment shown comprises an optical splitter, is configured for transmitting an optical signal from the OTDR optical connection port 18 to each of the N optical paths 60-64 and for transmitting an optical signal from each of the N optical paths 60-64 to the OTDR connection port 18.

The optical system 10' shown in FIG. 1*b* further comprises N−1 signal alteration devices 30-34 (of which only two are exemplarily shown), wherein each of the signal alteration devices is optically coupled between the optical coupling device 20 and a respective one of the ONTs 62-64 through a respective one of the optical paths 54-56. The optical system 10 further comprises an optical coupler 70 that is configured for optically connecting the OTDR optical connection port 18 with each of the N optical paths 52-56 through the optical coupling device 20. An OLT 66 is optically connected to the optical coupling device 20, which in the embodiment shown comprises the common path branching point, through a main optical path 50. The optical coupler 70 is arranged between the OLT 66 and the optical coupling device 20.

Each of the signal alteration devices 30-34 can be configured for altering the at least one predefined optical property of a respective optical signal transmitted through the respective optical path 54-56 in a different manner. For example, a first signal alteration device 30 can be configured for altering the at least one predefined optical property of an optical signal transmitted through the second optical path 54 and the (N−1)$^{th}$ signal alteration device 34 can be configured for altering the at least one predefined optical property of an optical signal transmitted through the N$^{th}$ optical path 56, wherein the at least one predefined optical property is altered differently each time.

Additionally or alternatively, each of the signal alteration devices 30-34 can be configured for altering a corresponding predefined optical property for a respective optical signal transmitted through the respective optical path 54-56.

Figure 2:
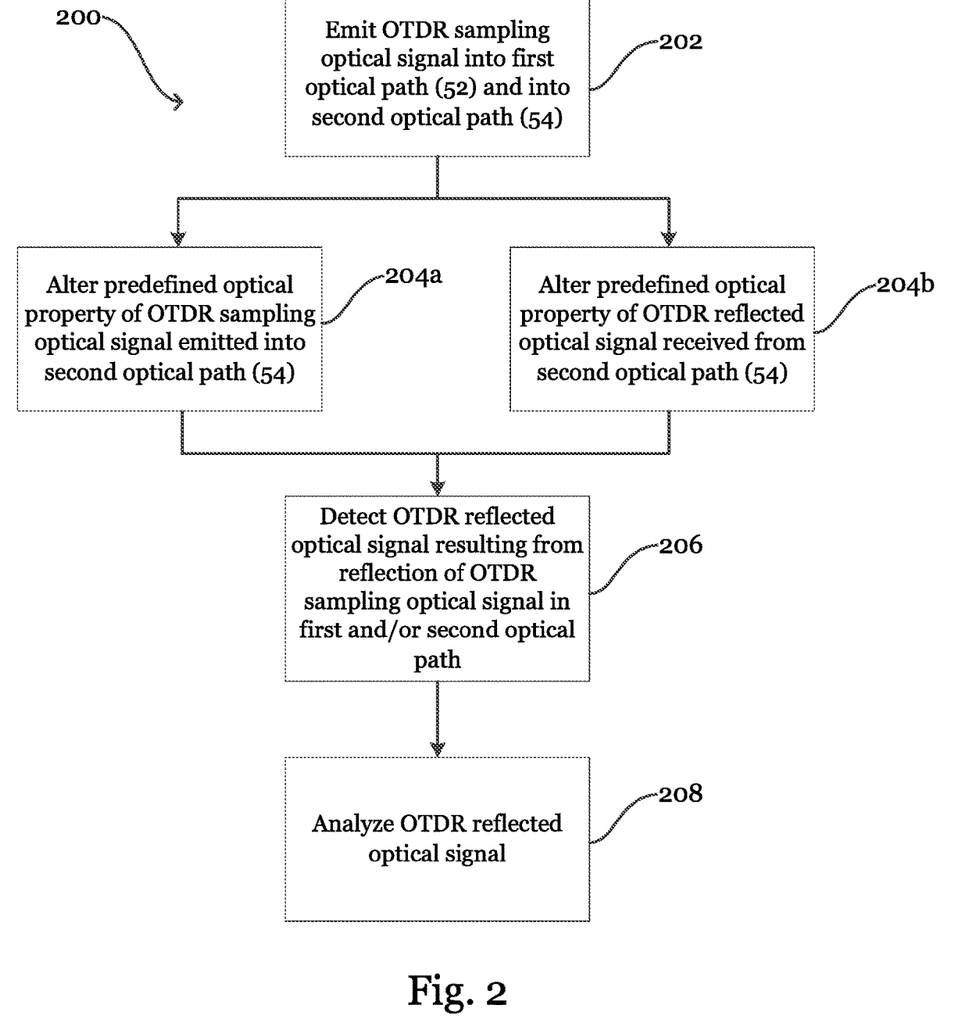
FIG. 2 shows a flow diagram illustrating a method of performing an OTDR measurement according to an embodiment of the invention.

FIG. 2 shows a flow diagram illustrating a method 200 of performing an OTDR measurement in an optical transmission system comprising a first optical path 52 and a second optical path 54, wherein the first optical path 52 and the second optical path 54 have a common path branching point according to an embodiment of the invention. The method 200 illustrated in FIG. 2 may be better understood in connection with the optical system 10 shown in FIG. 1*a*, although the method 200 need not be applied to the particular exemplary embodiment shown in FIG. 1*a*.

A method step 202 comprises emitting an OTDR sampling optical signal into the first optical path 52 and into the second optical path 54. The OTDR sampling optical signal may be fed into the OTDR optical connection port 18 and transmitted through the optical coupler 70 and the optical coupling device 20 for being emitted into the first optical path 52 and into the second optical path 54.

A further method step comprises altering at least one predefined optical property of the OTDR sampling optical signal emitted into the second optical path 54 (step 204*a*) and/or of an OTDR reflected optical signal received from the second optical path 54 (step 204*b*). Method steps 204*a* and 204*b* may be carried out as alternatives or in combination, that is, the at least one predefined optical property may be altered before a reflection event occurs (step 204*a*), after a reflection event occurs (step 204*b*), or both.

As a result of method steps 204*a* and/or 204*b*, although the OTDR sampling optical signal generated in method step 202 for being emitted into the first optical path 52 and into the second optical path 54 was one and the same, an OTDR reflected optical signal that is received from the first optical path 52 can be distinguished from an OTDR reflected optical signal that is received from the second optical path 54 with respect to the at least one predefined optical property.

For example, if the at least one predefined optical property corresponds to a pulse width, the pulse width of an OTDR sampling optical signal and/or an OTDR reflected optical signal transmitted on the second optical path 54 may be broader or narrower than the pulse width of an OTDR sampling optical signal and/or an OTDR reflected optical signal transmitted on the first optical path 52 due to the effect of action of the signal alteration device 30. If the at least one predefined optical property corresponds to a pulse shape, the pulse shape of an OTDR sampling optical signal and/or an OTDR reflected optical signal transmitted on the second optical path 54 may be different from the pulse shape of an OTDR sampling optical signal and/or an OTDR reflected optical signal transmitted on the first optical path 52 due to the effect of action of the signal alteration device 30. Note that it is also possible to alter more than one predefined optical properties, for example both a pulse shape and a pulse width of the OTDR sampling optical signal and/or an OTDR reflected optical signal transmitted on the second optical path 54.

A further method step 206 comprises detecting an OTDR reflected optical signal that results from a reflection of the OTDR sampling optical signal on the first optical path 52 and/or on the second optical path 54. If the OTDR sampling optical signal transmitted on the first optical path 52 encounters an irregularity that triggers a reflection event, an OTDR reflected optical signal is formed, that is reflected back on the first optical path 52 through the optical coupling device 20 and the coupler 70 to the OTDR optical connection port 18. Such an OTDR reflected optical signal resulting from a reflection on the first optical fiber 52 reaches the OTDR optical connection port 18 unaltered with respect to the at least one predefined optical property.

If the OTDR sampling optical signal transmitted on the second optical path 54 encounters an irregularity and results in an OTDR reflected optical signal, this OTDR reflected optical signal is reflected back on the second optical path 54 through the signal alteration device 30, the optical coupling device 20 and the coupler 70 to the OTDR optical connection port 18 and reaches the OTDR optical connection port 18b being altered with respect to the at least one predefined optical property. This is a result of the signal alteration device 30 having altered the at least one predefined optical property of the OTDR sampling optical signal that was transmitted from the OTDR optical connection port 18 to the second optical path 54, of the OTDR reflected optical signal that was reflected back from the second optical path 54 to the OTDR optical connection port 18, or a combination of both.

If, for example, both the OTDR sampling optical signal transmitted on the first optical path 52 and the OTDR sampling optical signal transmitted on the second optical path 54 encounter an irregularity and result in respective OTDR reflected optical signals that are reflected back to the OTDR optical connection port 18, the OTDR reflected optical signal that reaches the OTDR optical connection port 18 and is detected in method step 206 corresponds to a superposition of a first OTDR reflected optical signal resulting from the reflection on the first optical path 52 and a second OTDR reflected optical signal resulting from the reflection on the second optical path 54. For instance, there may be a first irregularity on the first optical path 52 and a second irregularity on the second optical path 54.

A further method step 208 comprises analysing the OTDR reflected optical signal to determine, based on the at least one predefined optical property, whether the OTDR reflected optical signal resulted from a reflection on the first optical path 52 and/or from a reflection on the second optical path 54. The analysis may be performed according to any of the embodiments of the invention explained above, of which some examples will be now given with reference to FIG. 3 to 5.

Figure 3:
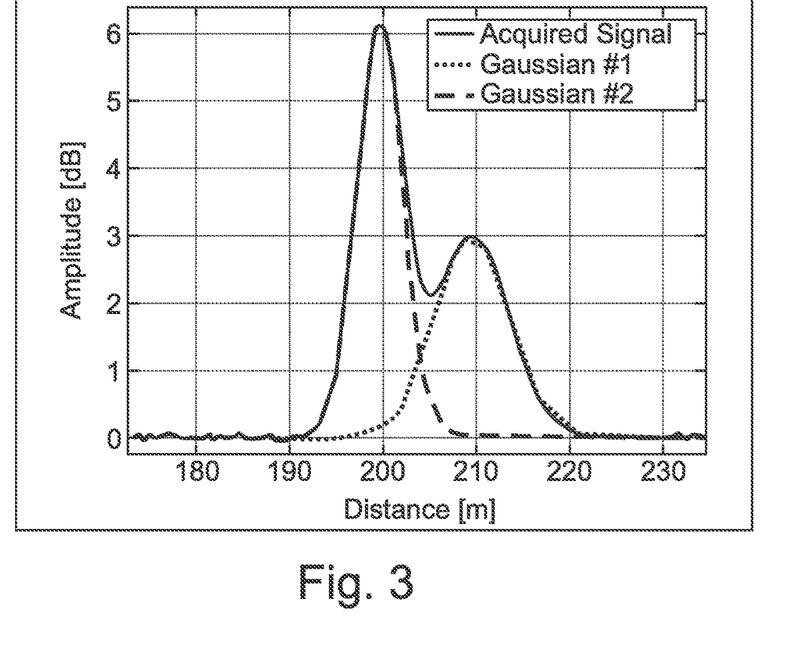
FIG. 3 illustrates the analysis of a signal in a method according to an embodiment of the invention.

FIG. 3 illustrates a representation of an OTDR reflected optical signal resulting from a first reflection of the OTDR sampling optical signal at a distance of 200 m from the OTDR optical connection port 18, and from a second reflection of the OTDR sampling optical signal at a distance of 210 m from the OTDR optical connection port 18. The amplitude of the OTDR reflected optical signal is represented against time as a solid line. In the example illustrated in FIG. 3, analysing the OTDR reflected optical signal comprises analysing a superposition of a first OTDR reflected optical signal resulting from one of the reflections and a second OTDR reflected optical signal resulting from the other one of the reflections.

A number of local maxima is detected in the OTDR reflected optical signal. In the example shown in FIG. 3, a peak picking algorithm is used that reveals that the OTDR reflected optical signal contains two local maxima. This is a consequence of the OTDR reflected optical signal comprising a first OTDR reflected optical signal and a second OTDR reflected optical signal. Accordingly, the analysis of the OTDR reflected optical signal is adapted to fit a superposition of a first model function and a second model function to the OTDR reflected optical signal.

Figure 4:
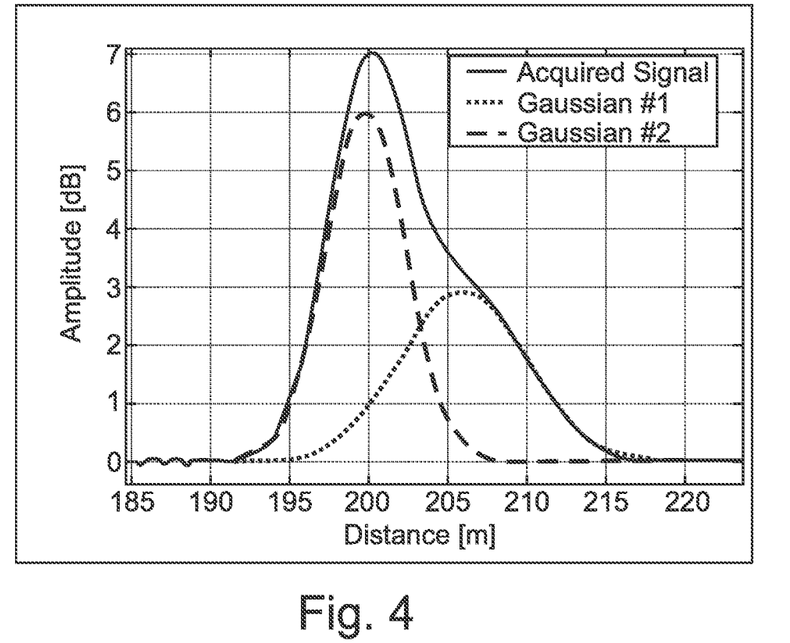
FIG. 4 illustrates the analysis of a signal in a method according to another embodiment of the invention.
Figure 5:
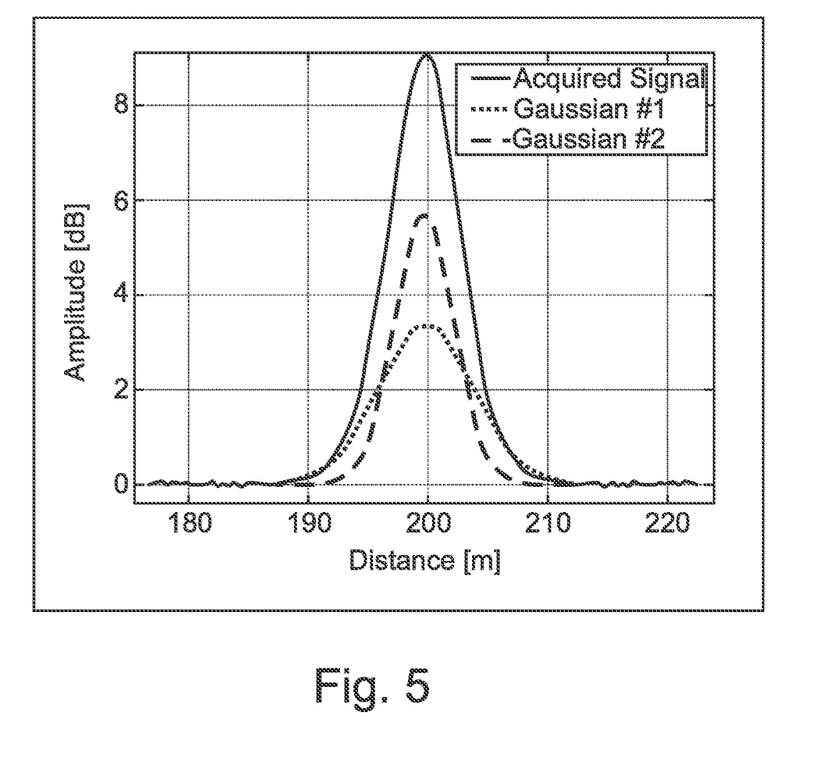
FIG. 5 illustrates the analysis of a signal in a method according to another embodiment of the invention.

The first OTDR reflected optical signal and the second OTDR reflected optical signal are correlated in time as follows. The first and second model functions are represented as dashed lines in FIG. 3 to 5. In the considered example, each of the first and second model functions are Gauss functions g(x) of the form:

$$g_i(x) = a_i e^{-\frac{(x-b_i)^2}{2c_i^2}}, i = 1, 2;$$

wherein i=1 refers to the first model function and i=2 refers to the second model function, x stands for the distance between the reflection event and the OTDR optical connection port 18 along the first optical path or the second optical path, a defines the amplitude, b defines the position of the center of the Gaussian peak, and c relates to the standard deviation and is hence related to the pulse width.

If the detected OTDR reflected optical signal represented in FIGS. 3 to 5 by a solid line is denoted as $f_{OTDR}$, a difference between the OTDR reflected optical signal $f_{OTDR}$ and the first and second model functions can be minimized by minimizing a least squares error function defined as:

$$s = \sum_{j=1}^{n} \left( a_1 e^{-\frac{(x_j-b_1)^2}{2c_1^2}} + a_2 e^{-\frac{(x_j-b_2)^2}{2c_2^2}} - f_{OTDRj} \right)^2,$$

wherein j stands for the jth acquired sample of $f_{OTDR}$. A combination of parameters a, b, and c can hence be determined that minimizes the error function s. In the present case, the minimization yields:

$a_1=6$, $b_1=200$, and $c_1=5$ for the first model function; and $a_2=3$, $b_2=210$, $c_1=5$ for the second model function.

The first model function $g_1$, as defined by $a_1$, $b_1$, and $c_1$ and the second model function $g_2$, as defined by $a_2$, $b_2$, and $c_2$ can hence be individually compared with the OTDR sampling optical signal taking the reflection and diffraction characteristic of the first and second optical paths into account to determine which of the first and second model functions corresponds to each of the first and second OTDR reflection optical signal. If, for example, the at least one predefined optical property is altered by broadening the pulse width, and the first model function displays a pulse width that exceeds the pulse width that would be expected for a reflection of the OTDR sampling optical signal, it may be concluded that the first model function corresponds to a first OTDR reflected optical signal resulting from a reflection event on the second optical path 54 at a distance of 200 m from the OTDR optical connection port 18. If, instead, the first model function displays a pulse width that coincides with the pulse width that would be expected for a reflection of the OTDR sampling optical signal taking the reflection characteristic of the first optical path 52, it may be concluded that the first model function corresponds to a first OTDR reflected optical signal resulting from a reflection event on the first optical path 52 at a distance of 200 m from the OTDR optical connection port 18.

The same analysis may be analogously performed for the second model function, so that after the analysis, it is possible to determine the location of each of the reflection events and whether they occurred on the first optical path 52 or on the second optical path 54.

FIG. 4 and FIG. 5 respectively illustrate situations analogous to that explained with reference to FIG. 3. In FIG. 4, the irregularities are respectively located at distances from the OTDR optical connection port 18 of 200 m and 206 m.

In FIG. 5 illustrates a situation in which a first reflection event occurs on the first optical path 52 and a second reflection event occurs on the second optical path 54, wherein the first and second reflection events occur at identical distances from the OTDR optical connection port 18, in this example at a distance of 200 m. Even in this extreme situation, the invention allows determining which one of the first OTDR reflected optical signal and the second OTDR reflected optical signal originated on which optical path.

Figure 6:
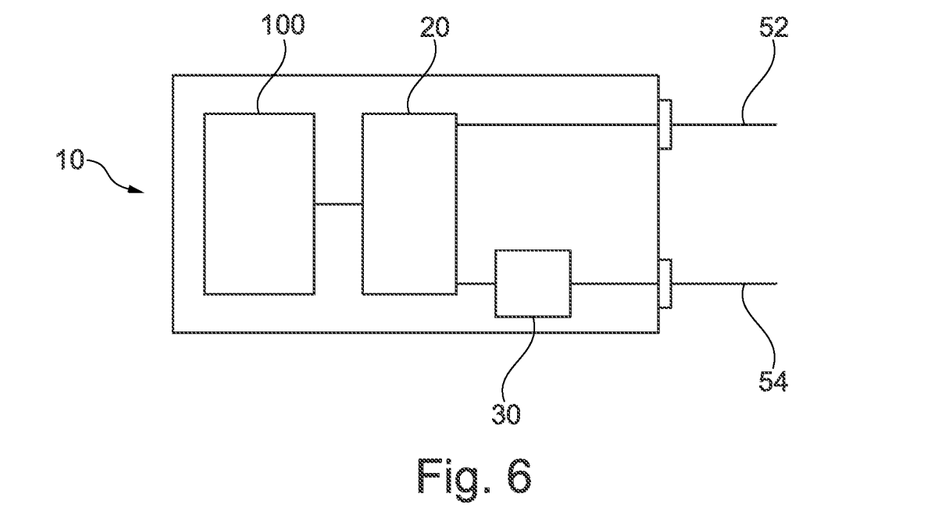
FIG. 6 shows an optical system according to another embodiment of the invention.

FIG. 6 shows an optical system 10 suitable for performing an OTDR measurement in an optical transmission system according to an embodiment of the invention. The optical system 10 of FIG. 6 has the same basic structure as the optical system 10 shown in FIG. 1a. The same reference signs are used for the same components, which are not described again. The optical system 10 comprises an optical time domain reflectometer 100 that is optically connected to the OTDR optical connection port 18 (not shown). The optical domain reflectometer 100 is configured for emitting an OTDR sampling optical signal into the first optical path 52 and into the second optical path 54 through the optical coupling device 20 and of detecting an OTDR reflected optical signal resulting from a reflection of the OTDR sampling optical signal on the first optical path 52 or on the second optical path 54 according to the method explained with reference to FIG. 2 or to any of the methods described above.

The optical time domain reflectometer 100 further comprises a processing unit that is configured for analysing the OTDR reflected optical signal to determine, based on the at least one predefined optical property altered by the signal alteration device 30, whether an OTDR reflected optical signal detected in the optical time domain reflectometer 100 resulted from a reflection on the first optical path 52 and or from a reflection on the second optical path 54.

Figure 7:
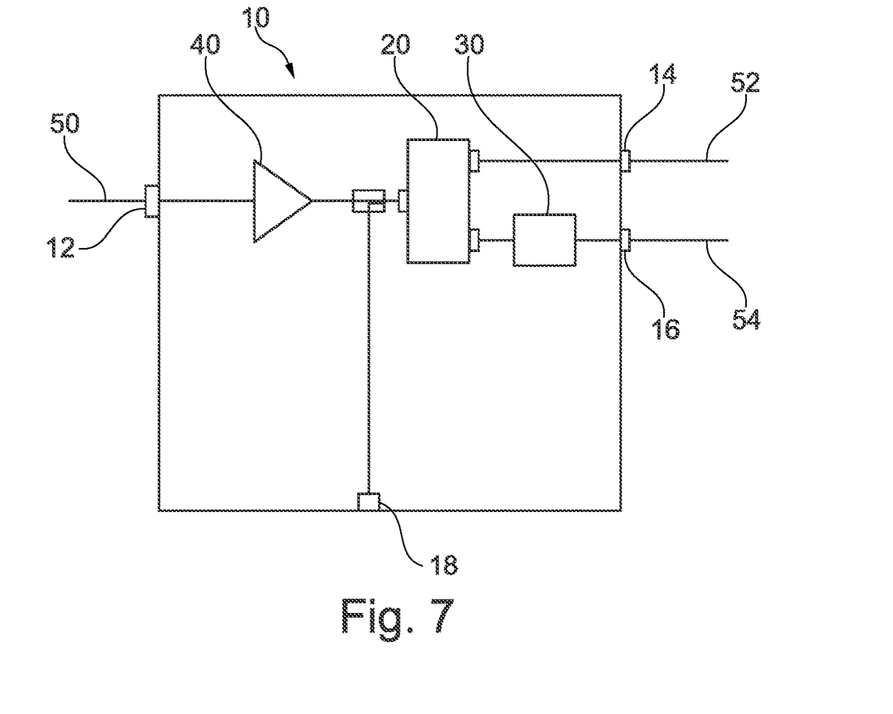
FIG. 7 shows an optical system according to another embodiment of the invention.

FIG. 7 shows an optical system 10 according to a further embodiment of the invention. The optical system 10 is an optical arrangement configured for being integrated in an existing optical transmission system at a transmitting node so as to implement optical path protection via the first optical path 52 and the second optical path 54. The optical system 10 comprises a first optical connection port 14 suitable for being optically connected with the first optical path 52, a second optical connection port 16 suitable for being optically connected with the second optical path 54, and a third optical connection port 12 suitable for being optically connected with a main optical path 50. The optical system 10 is adapted to transmit optical data received from the main optical path 50 to the first optical path 52 and the second optical path 54 for protected transmission.

The optical system 10 comprises an optical coupler 20 and a photonic crystal fiber 30 that respectively act as the optical coupling device 20 and as a pulse broadening device 30 as described above. The optical connection port 12 is optically connected with the optical coupling device 20 through an optical amplifier 40 that is configured for amplifying and optical data signal being transmitted between the main optical path 50 and the first optical path 52 and/or the second optical path 54.

The photonic crystal fiber 30 is configured for broadening a pulse width of the OTDR sampling optical signal emitted into the second optical path 54 and of any OTDR reflected optical signal received from the second optical path 54 within a predefined wavelength subrange corresponding to the C-band, i.e., between 1530 nm and 1565 nm. This ensures that the action of the photonic crystal fiber does not interfere in the transmission of the optical data between the optical path 50 and the first optical path 52 and the second optical path 54, which may take place in a different wavelength subrange, which is sufficiently separated from the C-band.

Figure 8:
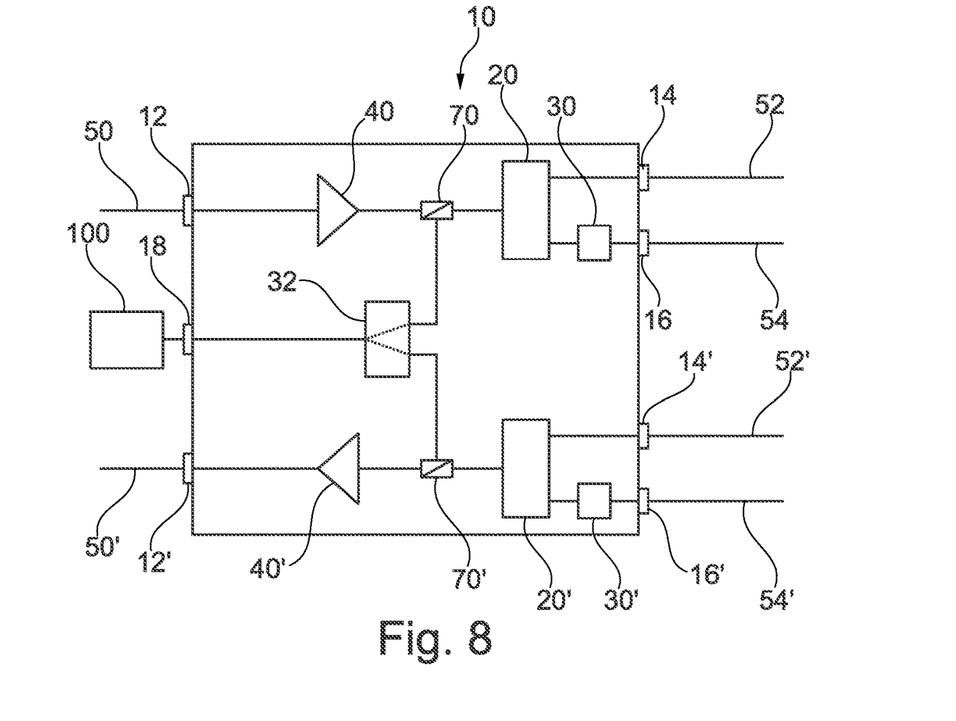
FIG. 8 shows an optical time reflectometer according to an embodiment of the invention.

FIG. 8. shows an optical system 10 according to a further embodiment of the invention. The optical system 10 of FIG. 8 is an optical arrangement configured for being integrated in an existing optical transmission system at a transceiver node so as to implement optical path protection via two first optical paths 52 and 52', and two second optical paths 54 and 54'. The optical system 10 comprises two first optical connection ports 14 and 14' that are respectively suitable for being optically connected with a corresponding one of the first optical paths 52 and 52', two second optical connection port 16 and 16' that are respectively suitable for being optically connected with a corresponding one of the second optical paths 54 and 54', and two third optical connection ports 12 that are suitable for being optically connected with a corresponding one of the main optical paths 50 and 50'. The optical system 10 is adapted to transmit optical data received from one of the main optical paths 50 to one of the first optical paths 52 and one of the second optical paths 54, and to transmit optical data received from the other one of the first optical paths 52' and the other one of the second optical paths 54' to the other one of the main optical paths 50' for protected transmission. The same reference signs are used for components that have been previously described with respect to the foregoing figures, which are not described again.

The optical system 10 shown in FIG. 8 further comprises a second optical coupling device 20 and a second signal alteration device 30 for implementing the principles of the invention on the second optical link that includes the optical paths 50', 52' and 54', the first optical link including the optical paths 50, 52, and 54. In the optical system 10 shown in FIG. 8, the optical connection port 12' is optically connected with the optical coupling device 20' through an optical amplifier 40' that is configured for amplifying and optical data signal being transmitted from the first optical path 52' and/or the second optical path 54' to the main optical path 50'.

The OTDR optical connection port 18 is optically connected with one of the first optical paths 52 and one of the second optical paths 54 through the first optical coupling device 20 by means of a first optical coupler 70. Further, the OTDR optical connection port 18 is optically connected with the other one of the first optical path 52' and the other one of the second optical path 54' through the second optical coupling device 20 by means of a second optical coupler 70'. The first and second optical couplers 70 and 70' comprise an optical filter configured for directing a part of an optical signal to the OTDR optical connection port corresponding to a wavelength range employed for OTDR measurements, for example the C-band.

The optical system 10 further comprises an optical switch 32 optically connected between the OTDR optical connection port on one side and the first optical coupling device 20 and the second optical coupling device 20' on the other side. The optical switch 32 is configured for selectively optically connecting the OTDR optical connection port 18 with one of the first optical path 52 and the corresponding one of the second optical path 54 through the first optical coupler 70 and through the first optical coupling device 20 or the other one of the first optical path 52' and the corresponding other one of the second optical path 54' through the second optical coupler 70' and through the second optical coupling device 20'. The optical switch 32 hence allows selectively operating an optical time domain reflectometer 100 optically connected with the OTDR optical connection port 18 to perform OTDR measurements according to the principles of the invention on the first optical link, including the first optical path 52, the second optical path 54, and the main optical path 50, or on the second optical link, including the first optical path 52', the second optical path 54', and a main optical path 50'.

Although preferred exemplary embodiments are shown and specified in detail in the drawings and the preceding specification, these should be viewed as purely exemplary and not as limiting the invention. It is noted in this regard that only the preferred exemplary embodiments are shown and specified, and all variations and modifications should be protected that presently or in the future lie within the scope of protection of the invention as defined in the claims.

The invention claimed is:

1. A method of performing an optical time domain reflectometry, OTDR, measurement in an optical transmission system comprising a first optical path and a second optical path, wherein the first optical path and the second optical path have a common path branching point, wherein the method comprises:
    emitting an OTDR sampling optical signal into the first optical path and into the second optical path through the common path branching point;
    altering at least one predefined optical property of the OTDR sampling optical signal emitted into the second optical path and/or of a reflection of the OTDR sampling optical signal received from the second optical path;
    detecting an OTDR reflected optical signal resulting from a reflection of the OTDR sampling optical signal on the first optical path and/or from said reflection of the OTDR sampling optical signal on the second optical path; and
    analyzing the OTDR reflected optical signal to determine, based on the at least one predefined optical property, whether the OTDR reflected optical signal resulted from a reflection on the first optical path and/or from a reflection on the second optical path.

2. The method of claim 1, wherein the first optical path is parallel to the first optical path.

3. The method of claim 1, wherein the at least one optical property comprises one or more of a pulse width, a pulse shape, a chromatic dispersion, and a polarization mode dispersion.

4. The method of claim 1, wherein the at least one optical property comprises a pulse width, and wherein altering the at least one optical property comprises broadening or narrowing the pulse width of the OTDR sampling optical signal emitted into the second optical path and/or of said reflection of the OTDR sampling optical signal received from the second optical path.

5. The method of claim 1, wherein the at least one predefined optical property is altered by means of a photonic crystal fiber and/or an optical filter.

6. The method of claim 1, wherein the at least one optical property is selectively altered within a predefined wavelength subrange of the OTDR sampling optical signal and/or of the OTDR reflected optical signal.

7. The method of claim 1, wherein analyzing the OTDR reflected optical signal comprises analyzing a superposition of a first OTDR reflected optical signal and a second OTDR reflected optical signal, wherein the first OTDR reflected optical signal results from a first reflection of the OTDR sampling optical signal on the first optical path and/or on the second optical path, and wherein the second OTDR reflected optical signal results from a second reflection of the OTDR sampling optical signal on the first optical path and/or on the second optical path.

8. The method of claim 1, wherein analyzing the OTDR reflected optical signal comprises detecting a number of local maxima in the OTDR reflected optical signal.

9. The method of claim 1, wherein analyzing the OTDR reflected optical signal comprises fitting one or more model functions to the OTDR reflected optical signal.

10. An optical system suitable for performing an optical time domain reflectometry (OTDR) measurement in an optical transmission system comprising a first optical path and a second optical path at least a portion of which is physically distinct from the first optical path, wherein the optical system comprises:
    an optical time domain reflectometer configured to provide an OTDR sampling optical signal;
    a common optical path configured to extend between the optical time domain reflectometer and each of the first optical path and second optical path, wherein the common optical path is further configured to communicate at least one of:
        to each of the first optical path and the second optical path, the OTDR sampling optical signal from the optical time domain reflectometer;
        to the optical time domain reflectometer, a respective reflection of the OTDR sampling optical signal communicated along at least one of the respective first optical path and second optical path; and
    wherein the second optical path is, at a portion of the second optical path that is physically distinct from the first optical path, configured to alter at least one predefined optical property of at least one of:
        the OTDR sampling optical signal communicated along the second optical path;
        the reflection of the OTDR sampling optical signal communicated along the second optical path;
    wherein the optical time domain reflectometer is configured to detect an OTDR reflected optical signal resulting from at least one of:
        the reflection of the OTDR sampling optical signal communicated along the first optical path;
        the reflection of the OTDR sampling optical signal communicated along the second optical path; and
    wherein the optical time domain reflectometer is further configured to analyze the OTDR reflected optical signal to determine, based on the at least one predefined optical property, whether the detected OTDR reflected optical signal resulted from a reflection of the OTDR sampling optical signal communicated along a given optical path among the first optical path and the second optical path.

11. The optical system of claim 10, wherein the at least one optical property comprises a pulse width, and wherein the second optical path is configured to one of:
    broaden the pulse width;
    narrow the pulse width.

12. The optical system of claim 10, wherein the second optical path is configured for selectively altering the predefined optical property within a predefined wavelength subrange.

13. The optical system of claim 10, further comprising an optical switch configured for selectively and optically coupling the optical time domain reflectometer with each of a plurality of paths that comprise at least each of the first optical path and the second optical path.

14. A method of performing an optical time domain reflectometry (OTDR) measurement in an optical transmission system comprising a first optical path and a second optical path at least a portion of which is physically distinct from the first optical path, wherein the method comprises:
   optically communicating an OTDR sampling optical signal along each of the first optical path and the second optical path;
   altering at least one predefined optical property of at least one of:
      the OTDR sampling optical signal communicated along the second optical path;
      a reflection of the OTDR sampling optical signal communicated along the second optical path;
   detecting an OTDR reflected optical signal resulting from at least one of:
      a reflection of the OTDR sampling optical signal communicated along the first optical path;
      the reflection of the OTDR sampling optical signal communicated along the second optical path; and
   analyzing the OTDR reflected optical signal to determine, based on the at least one predefined optical property, whether the detected OTDR reflected optical signal resulted from a reflection of the OTDR sampling optical signal communicated along a given optical path among the first optical path and the second optical path.

15. The method of claim 14, wherein the at least one optical property comprises at least one of:
   a pulse width;
   a pulse shape;
   a chromatic dispersion;
   a polarization mode dispersion.

16. The method of claim 14, wherein the at least one optical property comprises a pulse width, and wherein altering the at least one optical property comprises one of:
   broadening the pulse width;
   narrowing the pulse width.

17. The method of claim 14, wherein the at least one predefined optical property is altered by means of at least one of:
   a photonic crystal fiber;
   an optical filter.

18. The method of claim 14, wherein analyzing the OTDR reflected optical signal comprises analyzing a superposition of at least:
   a first OTDR reflected optical signal resulting from the reflection of the OTDR sampling optical signal communicated along the first optical path; and
   a second OTDR reflected optical signal resulting from the reflection of the OTDR sampling optical signal communicated along the second optical path.

19. The method of claim 14, wherein analyzing the OTDR reflected optical signal comprises at least one of:
   detecting a number of local maxima in the OTDR reflected optical signal;
   fitting at least one model function to the OTDR reflected optical signal.

\* \* \* \* \*